United States Patent [19]

Rattunde

[11] 4,292,031
[45] Sep. 29, 1981

[54] INFINITELY VARIABLE CONE-PULLEY TRANSMISSION

[75] Inventor: Manfred Rattunde, Bad Homburg, Fed. Rep. of Germany

[73] Assignee: P.I.V. Antrieb Werner Reimers Kommanditgesellschaft, Bad Homburg, Fed. Rep. of Germany

[21] Appl. No.: 82,605

[22] Filed: Oct. 9, 1979

[30] Foreign Application Priority Data

Oct. 26, 1978 [DE] Fed. Rep. of Germany ....... 2846580

[51] Int. Cl.³ ............................................. F16H 11/02
[52] U.S. Cl. ......................................... 474/18; 474/28
[58] Field of Search .................. 474/8, 12, 18, 21, 28, 474/19, 43, 51, 70, 103, 104, 109, 110; 74/191

[56] References Cited

U.S. PATENT DOCUMENTS

| | | | |
|---|---|---|---|
| 2,993,385 | 7/1961 | Karig et al. ............................ | 474/18 |
| 3,052,132 | 9/1962 | Dittrich et al. ........................ | 474/18 |
| 3,200,666 | 8/1965 | Schrodt et al. ...................... | 474/18 X |
| 3,451,283 | 6/1969 | Rattunde .............................. | 474/18 |
| 3,596,528 | 8/1971 | Dittrich et al. ..................... | 474/18 X |
| 3,600,960 | 8/1971 | Karig et al. ......................... | 474/18 X |
| 3,704,634 | 12/1972 | Schrodt .............................. | 474/18 |
| 4,116,080 | 9/1978 | Besens ................................. | 474/21 |

FOREIGN PATENT DOCUMENTS

| | | | |
|---|---|---|---|
| 1210648 | 2/1966 | Fed. Rep. of Germany ........ | 474/28 |
| 1256023 | 6/1968 | Fed. Rep. of Germany . | |
| 2744627 | 4/1978 | Fed. Rep. of Germany ........ | 474/18 |
| 1073476 | 6/1967 | United Kingdom .................. | 474/28 |

Primary Examiner—C. J. Husar
Assistant Examiner—Moshe I. Cohen
Attorney, Agent, or Firm—Spencer & Kaye

[57] ABSTRACT

An infinitely variable cone-pulley transmission of the type including two pairs of cone pulley sheaves, each mounted on a respective shaft, a transmission member circulating between the pairs of pulley sheaves, a pressure cylinder at least partly defined by one pulley sheave of each pair and including a piston, a control valve supplying hydraulic pressure medium to each cylinder chamber, with the pressure being distributed between the two cylinder chambers in order to control the transmission ratio between the pulley sheave pairs, and a torque sensor associated with one of the shafts and active to control the hydraulic pressure in one of the chambers as a function of the torque on that one of the shafts, is supplemented by a two-part presser device which responds to the torque on one of the shafts in order to press one of the pulley sheaves on that shaft against the transmission member with a force which is a function of that torque.

11 Claims, 11 Drawing Figures

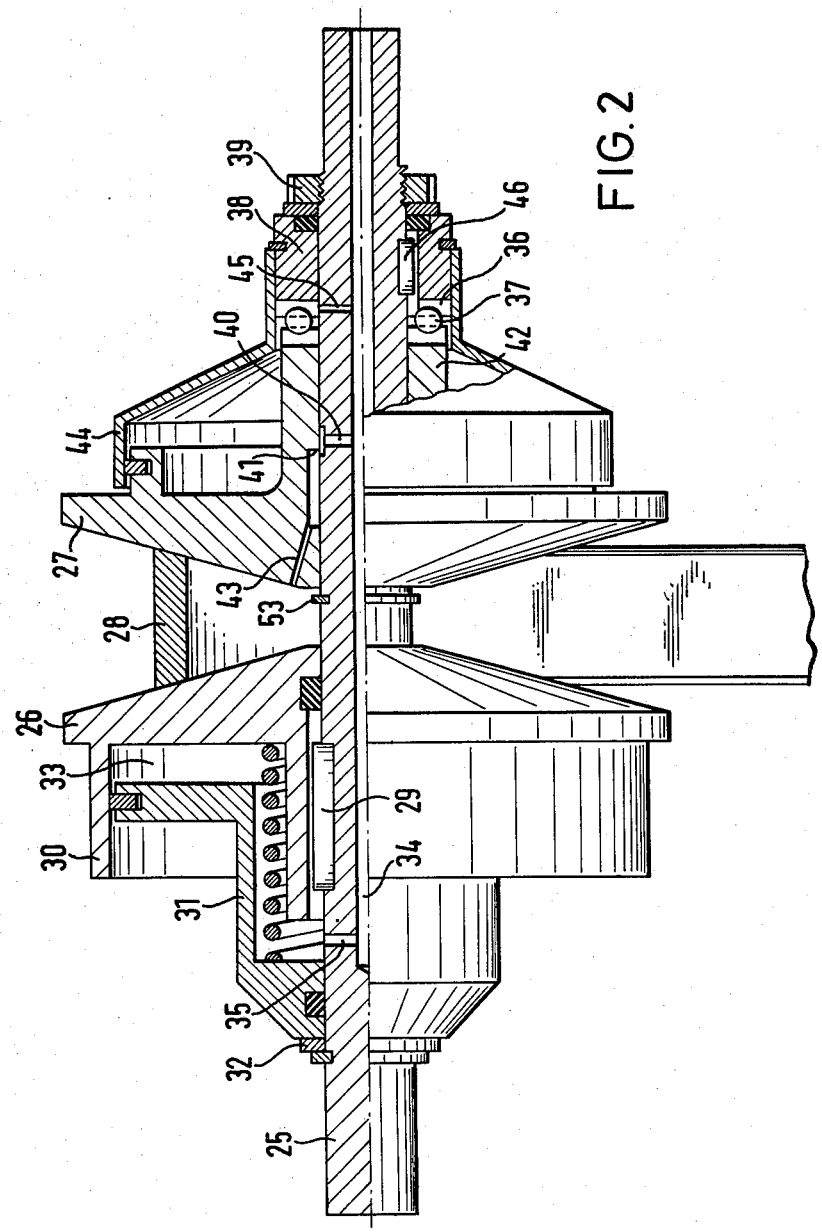

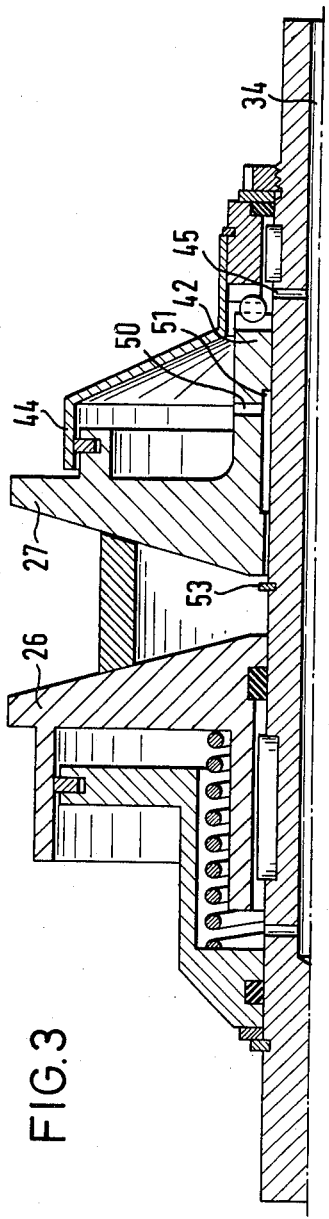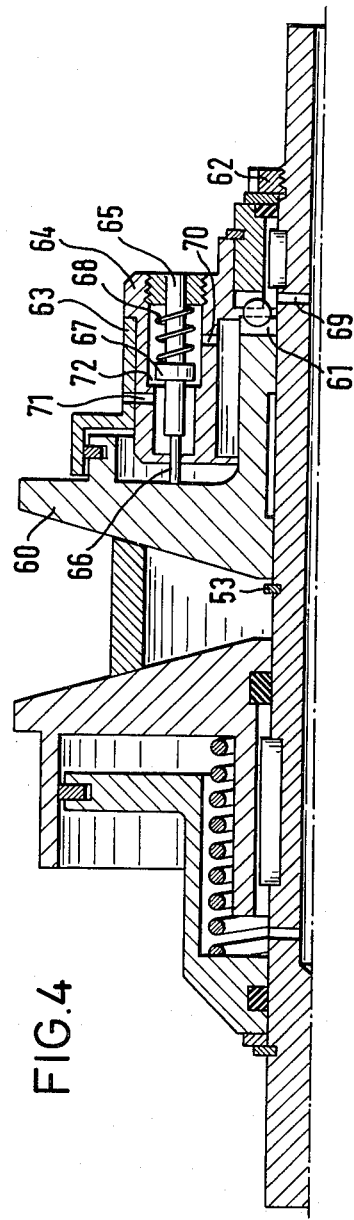

INFINITELY VARIABLE CONE-PULLEY TRANSMISSION

BACKGROUND OF THE INVENTION

The present invention relates to an infinitely variable cone-pulley transmission having a pair of cone pulley sheaves arranged on the drive-input shaft and a pair of cone pulley sheaves arranged on the drive-output shaft and transmission means circulating between the two pulley sheave pairs.

In transmissions of the type to which the invention is directed, one of the cone pulley sheaves on each shaft is axially displaceable along that shaft but is connected, at least indirectly, in rotation with the shaft and is formed as the axially displaceable pressure cylinder, rotating with the shaft, of a piston fixed to the shaft. A pressure medium for the setting and maintenance of the transmission ratio is distributed to the cylinder by a control slide valve which has four control edges and which is connected via a setting lever with one of the axially displaceable cone pulley sheaves. The two other cone pulley sheaves are supported so as to be axially fixed relative to the shaft.

For the load-dependent generation of pressure-application forces at least on one transmission shaft there is provided a sensor for the torque on that shaft, to which sensor the pressure medium flows under the pressure prevailing on its own or the opposite shaft in the cylinder-piston unit thereof for the setting and maintenance of the transmission ratio. This sensor generates by a torque-dependent movement of at least two valve parts of a valve in relation to one another, a torque-dependent hydraulic pressure and exclusively determines the requisite load-dependent, hydraulic pressure-application force.

Regarding the above-mentioned classification of transmissions, it must be remarked firstly that in the mentioned cylinder-piston unit it is of course also possible to effect an interchange of function by forming the cone pulley sheave which is displaceable for the transmission ratio as a piston which is displaceable in a cylinder fixed to the shaft. Ordinarily, however, the initially mentioned construction is used, for which reason it will be adopted for the following description of the invention.

The initially mentioned hydraulically adjustable cone-pulley transmissions are disclosed, by way of example, in U.S. Pat. No. 3,600,960. Beside their inherently very good properties in use however they have some disadvantageous properties which hinder their use for special or more demanding needs.

Thus, firstly, their construction costs are considerable, irrespective of whether the torque sensor is integrated into a pulley assembly or whether, as appears from an as yet undisclosed proposal, it is formed as an externally arranged prefabricated unit. The construction expense affects not only the formation of the torque sensor per se, but also its space requirement which has an unfavorable effect upon the overall size of the transmission in each case.

Furthermore, it is disadvantageous that on the occurrence of torque surges, as in starting up of the transmission, in the shifting of couplings of the driven masses, etc., a delay occurs in the build-up of the pressure medium pressure so that, upon the occurrence of torque surges, the known transmissions cannot react immediately, but only with delay to the increase of load.

Moreover, it is disadvantageous that the hydraulically adjustable cone-pulley transmissions require pump pre-running or an external oil supply for the start up operation, so that firstly the requisite oil pressure and oil flow are present before the transmission is set in motion, unless a hydraulic start-up or overload coupling is provided, such as disclosed in German Pat. No. 2,256,023, which likewise again constitutes a very space-demanding, complicated and expensive component.

Moreover, the yieldability of the support of the fixedly supported cone pulley sheavers, caused by material elasticity, and the material elasticity of the fixedly supported cone pulley sheaves themselves, starting from a specific transmission ratio setting, causes a variation of transmission ratio in dependence upon the loading transmitted by the transmission. In fact, although, as a rule, this transmission ratio variation amounts to only a few percent, it can, depending on the circumstances of the utilization case, constitute a serious disadvantage.

Finally, in the known transmissions it is necessary to provide a separate oil conduit for the lubrication and cooling of the frictional contacts between the transmission means and the cone pulleys.

SUMMARY OF THE INVENTION

It is an object of the invention to eliminate the above-stated disadvantages simultaneously, essentially by one single, simple measure requiring practically no additional space.

A more specific object of the invention is to provide a simple structural arrangement which in the case of torque surges guarantees a practically delay-free reaction of the transmission towards higher pressure application forces between the cone pulleys and the transmission means with simultaneous compensation of the axial yieldability of the fixed pulley sheave support and of the fixed pulley sheaves themselves, and renders the mentioned additional oil conduit for the lubrication of the transmission means superfluous.

The invention further provides the possibility of starting up of the transmission without pump pre-running and independently of an external oil supply.

These and other objects are achieved, according to the invention, by making at least one of the cone pulley sheaves which is nominally axially fixedly supported in relation to the shaft axially displaceable and rotatable in relation to the shaft, by fixedly supporting it and fixing it in rotation on the shaft by means of a torque-dependent presser device having mutually opposite pressure application surfaces for example defined by V-shaped incisions, and rolling bodies inserted between them, which device is axially fixedly supported via a ring thereof remote from the cone pulley sheave on the shaft and is connected in rotation with the shaft, and by arranging the fixedly supported cone pulley sheave to form or actuate one of the valve parts for the load-dependent generation of the pressure application force.

In this connection firstly it should be clarified that the terms "fixedly supported cone pulley sheave" or "fixed pulley sheave" denote, in the context of the present invention, a cone pulley sheave which is practically fixedly supported but which can travel minimal distances in the axial and peripheral directions, these distances being, especially in the axial direction, in the range of a few hundredths of a millimeter. Therefore the term "fixedly supported cone pulley sheave" or "fixed pulley sheave" within the scope of the invention is not to be understood in the sense of "rigidly supported" but in the sense of "practically stationarily or fixedly supported".

Embodiments of the invention operate to cause torque surges to act as small setting movements through the presser device directly, that is without interposition of the hydraulic circuit, upon at least one of the cone pulley sheaves and there lead to an axial displacement which compensates for the mechanical elasticities of the transmission. On the other hand, the fixed pulley sheave is at the same time directly one of the valve parts, so that in the case of torque surges it is possible, equally without delay, to act upon the pressure-medium pressure on a least one of the cone pulley sheaves which are displaceable for the setting and variation of the transmission ratio and form a cylinder-piston unit. In this manner torque surges are taken up immediately without the occurrence of a variation of the set transmission ratio. Furthermore, this is possible in a structurally simple and space-saving manner by the incorporation of the fixedly supported cone pulley sheave as a component of the torque sensor.

It has proved especially advantageous to form the fixedly supported cone pulley sheave as the piston of a cylinder-piston unit fixedly supported with its cylinder jacket in relation to the shaft, in which the pressure medium is present under the pressure flowing to the torque sensor, and to make the piston area of this cylinder-piston unit smaller than the piston area of the cylinder-piston unit for the setting and maintenance of the transmission ratio of the transmission.

In this way the fixed pulley sheave experiences a support pressure over its whole radial extent which relieves the pressure application device so that the latter again can be made as a correspondingly lighter structure and can react in a more finely sensitive manner.

According to specific preferred embodiments of the invention, the shaft is provided with a radial bore extending to its outer surface, connected to receive pressure medium at the pressure prevailing in the torque sensor and defining one of the valve parts, the other pulley sheave is formed to present a control edge cooperating with the end of the bore at the outer surface of the shaft and defining the other valve parts, and the other pulley sheave is provided with a flow passage extending between the valve and a low pressure region enclosed by the transmission means for the flow of pressure medium from the valve. The flow passage can extend substantially axially at an acute angle to the shaft, or the other pulley sheave can include a neck portion extending axially toward the one pulley sheave of its associated pair and the flow passage can be constituted by an axial groove on the inner periphery of the neck and a radial bore provided in the neck and extending from the groove.

According to another embodiment, there can be provided an auxiliary stop member fixed to the shaft between the pulley sheaves for limiting the axial movement of the other pulley sheave toward the one pulley sheave, the stop member being formed to constitute one of the valve parts, while the other pulley sheave presents a flow passage communicating with pressure medium at the pressure prevailing in the torque sensor and having an outlet end adjacent the stop member and defining the other valve part. The shaft can present a radial bore arranged for conducting pressure medium at the pressure prevailing in the torque sensor to the flow passage.

According to a further embodiment, the valve can be formed of a housing carried by one member of the cylinder-piston unit, a slide valve movably mounted in the housing and presenting a flow control piston constituting one of the valve parts, the housing presenting a control edge disposed to one side of the flow control piston and constituting the other valve part, a feeler pin carried by the slide valve and directed toward the other member of the cylinder-piston unit, a spring urging the slide valve toward the other member for maintaining the feeler pin in contact therewith, and means defining a flow passage for supplying pressure medium at the pressure prevailing in the torque sensor to the interior of the housing at the opposite side of the flow control piston from the control edge.

According to yet another embodiment of the invention, one pulley sheave of one pair is mounted to one side of the transmission means and one pulley sheave of the other pair is mounted to the other side of the transmission means, whereby those pulley sheaves are disposed diametrically opposite one another, and there is further provided a stationary guide member located between, and extending parallel to, the shafts, an approximately Z-shaped stirrup member mounted on the guide member for movement parallel to the shafts and presenting two arms spaced apart in the axial direction of the shafts and extending radially of the shafts, each arm extending toward a respective shaft, support means carried at the free end of each arm, pivot bearings interposed between each one pulley and the support means carried by a respective arm for supporting each one pulley with slight axial play against the support means, and pump drive means driven by one of the shafts and connected to drive the pump supplying pressure medium to the transmission.

According to a related embodiment, one pulley sheave of one pair is mounted to the same side of the transmission means as is one pulley sheave of the other pair, whereby those pulley sheaves are disposed substantially radially opposite one another, and there is further provided a stationary fulcrum member located substantially midway between the shafts, a two-arm lever centrally pivoted on the fulcrum member and extending substantially radially of the shafts, with each arm of the lever extending toward a respective shaft, support means carried at the free end of each arm, pivot bearings interposed between each one pulley sheave and the support means carried by a respective arm for supporting each one pulley sheave with slight axial play against the support means, and pump drive means driven by one of the shafts and connected to drive the pump.

Transmission structures according to the two last-described embodiments advantageously contribute to independence of pump pre-running or external oil supply in the starting up of the transmission. These features have the effect that the cone pulley sheaves for setting and maintaining the transmission ratio are initially mechanically supported via anti-friction, or low friction, bearings so that the transmission acts like a mechanically pressed-on cone-pulley transmission in starting up. Only after the build-up of the oil pressure, which takes place after a short time, do the cone pulley sheaves serving for setting and maintaining the transmission ratio lift away from their mechanical support, whereby the latter becomes irrelevant in effect for the further running of the transmission.

In accordance with yet another embodiment, the transmission is provided with a pump drive element rigidly fixed to the one shaft, and a friction coupling interposed between the pump drive element and the side of one first part of the presser device which is remote from the part thereof, the fixedly supported pulley sheave includes a neck portion projecting axially towards the other pulley sheave of its associated pair, and the latter pulley sheave is mounted on the neck portion to be axially movable but non-rotatable relative to the fixedly supported pulley sheave. These have the consequence that on starting up of the transmission drive only the oil pump is initially driven therewith, while the transmission is entrained slowly as the oil pressure builds up.

The objects of the invention have been described above initially exclusively in connection with devices associated with at least one of the nominally fixed pulley sheaves. Fundamentally however the invention can also involve appropriate measures applied preferably to the piston of the cylinder-piston unit which is formed at the same time by a cone pulley sheave for setting and varying the transmission ratio.

According to one such embodiment of the invention, a variable cone-pulley transmission having the basic structure described previously is provided with the following structural features:

the pulley sheave forming the cylinder-piston unit includes an axially extending neck portion forming part of its associated pressure cylinder, and is mounted to be rotatable relative to the shaft, the piston of that cylinder-piston unit is mounted on the neck portion of that pulley sheave to be axially displaceable, but non-rotatable, relative to the neck portion, and includes a first extension member extending axially away from the pulley sheave and a second extension member supported by the first extension member, presenting a radial surface facing away from the pulley sheave, and extending radially inwardly to bear against the shaft substantially without radial play, the torque sensor includes a torque responsive presser device composed of a first part secured against axial and rotational movement relative to the shaft, a second part carried by the radial surface of the second extension member of the piston, and rolling bodies interposed between the parts, the parts presenting mutually opposing, axially oblique faces against which the rolling bodies bear for axially displacing the piston relative to the shaft by a distance dependent on the torque between the parts, the shaft is provided with a radial bore extending between its outer surface and a low pressure region, with the end of the bore located at the outer surface constituting one of the valve parts, and the second extension member of the piston presents a control edge at its radially innermost surface, which control edge cooperates with the bore and constitutes the other one of the valve parts.

BRIEF DESCRIPTION OF THE DRAWINGS

FIG. 2 is a partly cross-sectional detail view of a cone pulley unit equipped with one preferred embodiment of a torque sensor according to the invention.

FIGS. 3 and 4 are cross-sectional detail views similar to the upper half of FIG. 2 of further preferred embodiments of torque sensors according to the invention.

DESCRIPTION OF THE PREFERRED EMBODIMENTS

Figure 1:
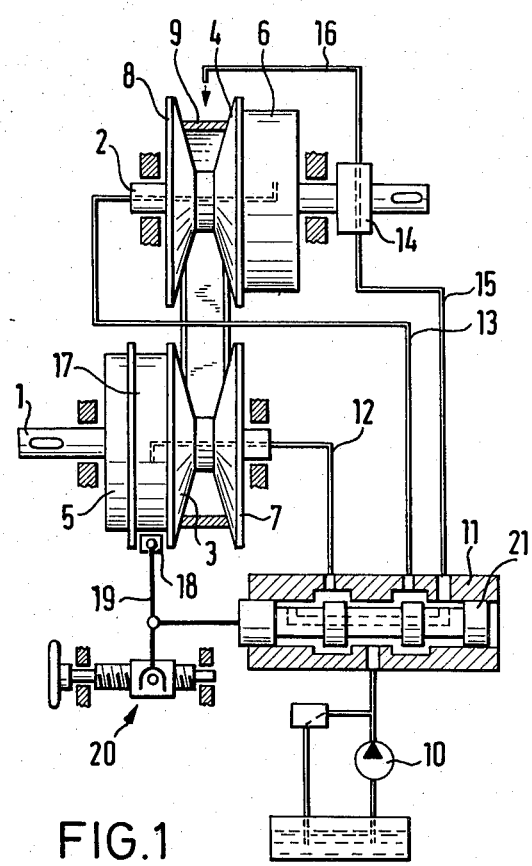
FIG. 1 is a simplified, pictorial, elevational view of a hydraulically adjustable cone-pulley transmission having a torque sensor.

FIG. 1 shows a known transmission with hydraulically displaceable cone pulley sheaves. The transmission includes a drive-input shaft 1 and a drive-output shaft 2 on each of which a cone-pulley sheave 3 or 4 is mounted to be axially displaceable relative to the shaft for setting and maintaining the transmission ratio. Each pulley sheave 3 and 4 forms a cylinder-piston unit 5 or 6. Opposite each pulley sheave 3 and 4, there is disposed a respective cone pulley sheave 7 or 8 fixedly supported at its respective shaft. A transmission means in the form of a belt 9 circulates between the respective cone-pulley sheave pairs.

Pressure medium, e.g. oil, is delivered from a pressure medium source and is distributed to the cylinder-piston units 5 and 6 by a control slide valve 11 having four control edges and via respective conduits 12 and 13. Moreover, on the drive-output shaft 2 a torque sensor 14 is seated to which the pressure medium flowing from the control slide valve 11 is fed through a conduit 15. Torque sensor 14 presents a constriction in the pressure medium flow path; the size of that constriction is a function of the torque on shaft 2 and determines the pressure in the cylinder-piston unit 5 on drive-input shaft 1. The mechanism by which this is achieved is described in U.S. Pat. No. 3,600,960. From the torque sensor 14 the pressure medium flows through a conduit 16 essentially at ambient pressure to the transmission means 9 to effect lubrication and cooling.

The cylinder 5 has a circumferential groove 17 to which the lever 19 of a transmission ratio setting member 20 is articulated through a slide block 18. The slide member 21 of the four-edge control slide valve 11 is pivotally articulated to the lever 19 between setting member 20 and slide block 18.

The manner of operation of this known transmission is to be briefly summarized again, the response to a variation of the transmission ratio not being explained further however, since it is generally known.

The transmission according to FIG. 1 is initially set to a specific transmission ratio. If now a torque surge occurs, i.e. the engine power output increases, the transmission tends to shift towards higher drive-input rotation speeds, since the torque sensor 14 acts to further constrict the outflow of the pressure medium through the conduit 16 to an extent dependent upon the magnitude of the torque surge, whereby on the drive-input side, in the cylinder 5, the pressure medium pressure increases and shifts the belt 9 at the drive-input side, outwardly, which tends to increase the belt travel speed and thus the drive-output rotation speed. In this case the slide block 18, balance lever 19 and slide member 21 are also entrained to the right. Thus the control edge for the drive-output cylinder 6 is opened further with the result that the pressure in the drive-output cylinder 6 also rises.

This action comes to an end when equilibrium of the forces between drive-input and drive-output, necessary in accordance with the laws of V-shaped belt-type transmissions, has established itself.

On the other hand, however, in the case of a variation of the pressure application forces caused by a torque surge or an increase of loading, a certain yielding of the supports for the fixed cone pulley sheaves 7 and 8 and a certain deformation of these pulley sheaves themselves, due to their inherent yieldability, take place, which cannot be detected through the torque sensor 14 and which lead to a transmission ratio variation of several percent, which remains present. This load-caused transmission ratio variation can in many cases be expressly unpleasant and undesired. Moreover the response of the torque sensor 14 is accompanied by a certain inertia which contributes in the case of torque surges, to an initial shifting of the transmission at least briefly towards higher rotational speeds at the drive-output side.

FIG. 2 shows one embodiment of the invention for countering these drawbacks of known, hydraulically shiftable transmissions. In this case only one shaft with its pulley assembly is illustrated, and this can be either the drive-input shaft or the drive-output shaft. Fundamentally it can also be the drive-input and drive-output shaft, as will be explained later in connection with a subsequent example.

According to FIG. 2, on a shaft 25 a pulley assembly 26, 27 is arranged, with a transmission means 28 being gripped between the pulley sheaves to advance in unison with rotation of the pulley. The cone pulley sheave 26 is the one which is axially displaceable on the shaft for setting and varying the transmission ratio and is made non-rotatable relative to the shaft by a key connection 29. The pulley sheave 26 at the same time forms the cylinder 30 of a cylinder-piston unit the piston 31 of which is fixed to the shaft 25 by means of a circlip 32, that is to say piston 31 is axially fixed on the shaft. Pressure medium delivered from the control side valve flows to the cylinder chamber 33 formed by piston 31 and cylinder 30 through an axial bore 34 and a radial bore 35.

On the other hand the cone pulley sheave 27 is the nominally fixed pulley sheave and is axially fixedly supported against a collar 39 secured on the shaft 25 via a presser device 36 with, for example, V-shaped recesses and balls or rollers 37 placed therebetween, and via a ring 38 of the presser device. Ring 38 is keyed to shaft 25 by a key 46. The cone pulley sheave 27 itself is axially displaceable and also rotatable relative the shaft. Details of such a presser device are disclosed in U.S. Pat. No. 3,600,960.

The cone pulley sheave 27 has a neck portion 42 presenting a control edge 41 that cooperates with a radial bore 40 of the shaft 25 to form a control valve to which the pressure medium supplied to the cylinder chamber 33 likewise flows from the shaft bore 34. Starting from the control edge 41, the pressure medium can flow away substantially at ambient pressure by way of a substantially axially extending bore 43 in the cone pulley sheave 27 on to the inside of the belt 28, where, as a result of centrifugal forces, it serves for lubrication and cooling of the belt. Movement of pulley sheave 27 to the left, toward pulley sheave 26, is limited by a retaining ring 53 secured to shaft 25.

The manner of operation of this apparatus is as follows:

When a torque is transmitted by or to the shaft 25, the ring 38 is entrained by the key 46. Thus the presser device 36, through the rollers 37, also entrains the cone pulley sheave 27, while at the same time, on account of the V-shaped recesses of the presser device, an axial force is exerted upon the cone pulley sheave 27 in the direction toward pulley sheave 26. On the other hand, in the cylinder chamber 33 a pressure-medium pressure prevails which serves there, or through the cone pulley sheave 26, for maintaining the transmission ratio setting.

If now a torque surge or a variation of load occurs, the presser device 36 exerts directly upon the cone pulley sheave 27 an axial force which also leads to a slight axial displacement of the cone pulley sheave 27 in the direction towards the belt 28. This small shift also further constricts the pressure-medium outflow past the control edge 41, so that the pressure-medium pressure in the cylinder chamber 33 increases in response to such torque increase. By appropriate dimensioning of the valve formed by radial bore 40 and control edge 41 in this way it is possible to achieve a load-dependent correction of the transmission ratio variation, as described with reference in FIG. 1. If the load increase caused by a torque surge drops off again, the cone pulley sheave 27, under control of the presser device 36, also sets itself back again. The corresponding movement of the control edge 41 then leads to a corresponding reduction of the pressure-medium pressure in the cylinder chamber 33.

The apparatus as described to this extent is capable, by itself, of functioning in the manner as explained. However, as further shown in FIG. 2, the cone pulley sheave 27 is formed together with a cylinder 44 into a cylinder-piston unit. The cylinder 44 is axially fixedly supported in relation to the ring 38 so that it cannot move to the right relative thereto. Pressure medium flows from the axial bore 34 to the pressure chamber of this cylinder-piston unit by way of a further radial bore 45 in the region of the presser device 36, so that in the cylinder chamber formed by cone pulley sheave 27 and cylinder 44 there likewise prevails the same pressure-medium pressure as in the cylinder chamber 33. It is essential here only that the piston area formed by the cone pulley sheave 27 is smaller than the piston area which is formed by the cone pulley sheave 26.

This further development serves to relieve the presser device 36 of load since a part of the axial force to be exerted upon the cone pulley sheave 27 is now applied by the pressure-medium. Thus the presser device 36 can work in a more finely sensitive manner. Due to the arrangement of the radial bore 45 moreover good lubrication of the presser device 36 is ensured.

FIG. 3 shows an arrangement which corresponds closely to the arrangement according to FIG. 2, except that, in FIG. 3, radial bore 40 is omitted and pressure medium flowing from the axial bore 34 through the radial bore 45 in the cylinder chamber formed by cone pulley sheave 27 and cylinder 44 departs from that cylinder chamber through a radial bore 50 in the pulley neck 42 and then passes through an axial internal groove 51 and into the interspace between the cone pulley sheaves 27 and 26. Ring 53, since it is directly next to cone pulley sheave 27 and is fast with the shaft, forms the throttle valve with the adjacent portion of pulley sheave 27. The closer the cone pulley sheave 27 comes to the ring 53, the greater is the constriction of the pressure medium flow.

The ring 53, moreover, acts to limit the axial travel of cone pulley sheave 27, as is the case in FIG. 2, where, however, ring 53 has no valve function.

FIG. 4 also shows an arrangement similar to FIG. 2, so that identical parts will not be described again in detail.

As shown in FIG. 4, the nominally fixed pulley sheave 60 is again torque-connected to a presser device 61 which is provided with a fixed stop 62 and a key so that it is immovable axially and rotationally relative to the shaft. The nominally fixed pulley sheave 60 with a fixed cylinder 63 forms a cylinder-piston unit. In the cylinder 63 there is mounted the housing 64 of a control valve 65 which acts via a feeler pin 66 upon the fixed pulley sheave 60. The control valve has a piston 67 and at the side of piston 67 which is remote from the feeler pin 66 a compression spring 68 is arranged which bears against the housing 64.

Pressure medium passes via a radial bore 69 in the shaft and the presser device 61 into the cylinder chamber formed by fixed pulley sheave 60 and cylinder 63. From there, the pressure medium passes through a bore 70 into the housing 64 of the control valve, around the control piston 67 through a gap 72 formed between piston 67 and housing 64, and away through a bore 71 extending radially through cylinder 63 and housing 64.

Upon an increase in torque, the presser device 61 pushes the fixed pulley sheave 60 to the left. Thus the control piston 67 is shifted likewise to the left by the action of the spring 68 and the control gap 72 narrows, which leads to an increase in the pressure-medium pressure and at the same time to a further shift of pulley sheave 60 to the left. The increase in the pressure-medium pressure corresponds, for both cone pulley sheaves on this shaft, to the necessary increase of the pressure application force, while again the slight shift of the fixed pulley sheave 60 brings about the transmission ratio correction.

FIG. 5 shows once again an overall transmission arrangement similar to that of FIG. 1 with a pulley and presser device arrangement corresponding practically to that of FIG. 2. Here such arrangement is provided on the shaft 80 provided with an axial bore 81 which is, however, closed by a stopper 82. As a result, the cylinder chamber 83 of the cone pulley sheave 84 which serves for setting the transmission ratio can be supplied with the drive-input-side pressure-medium pressure through a conduit 85, while the nominally fixed pulley sheave 86 is supplied through the presser device 87 and a conduit 88 with pressure-medium at the pressure which also prevails, through a conduit 89, in the cylinder-piston unit 90 at the drive-output side.

A further difference consists in that here the pressure medium cannot flow away to the low pressure side of the hydraulic circuit, as in FIG. 2, by way of a substantially axial bore in the fixed pulley sheave, but instead flows through a radial bore 91 which is formed in a prolonged neck 92 of pulley sheave 86. Cone pulley sheave 84 is mounted on neck 92 to be axially and rotatably movable relative thereto. However, pulley sheave 84 is keyed, via its associated cylinder member, for rotation with shaft 80.

Torque responsive control of the pressure in the piston-cylinder chambers of pulley sheaves 86 and 90 is effected by axial movements of pulley sheave 86 which vary the size of a constriction 93 formed between a groove in the outer surface of shaft 80 and a control edge formed on pulley sheave 86.

Figure 5:
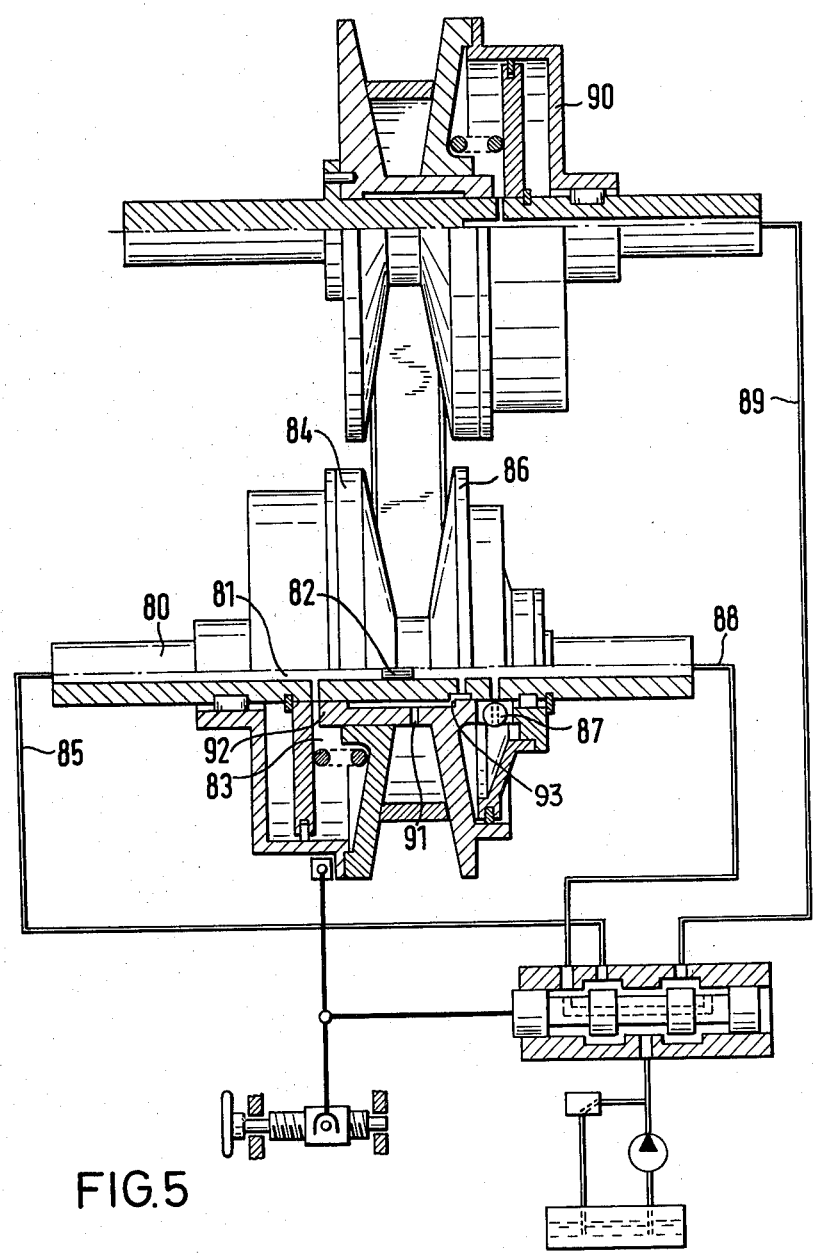
FIGS. 5 and 6 are elevational, partly cross-sectional views of cone-pulley transmissions provided with further embodiments of the invention.
Figure 6:
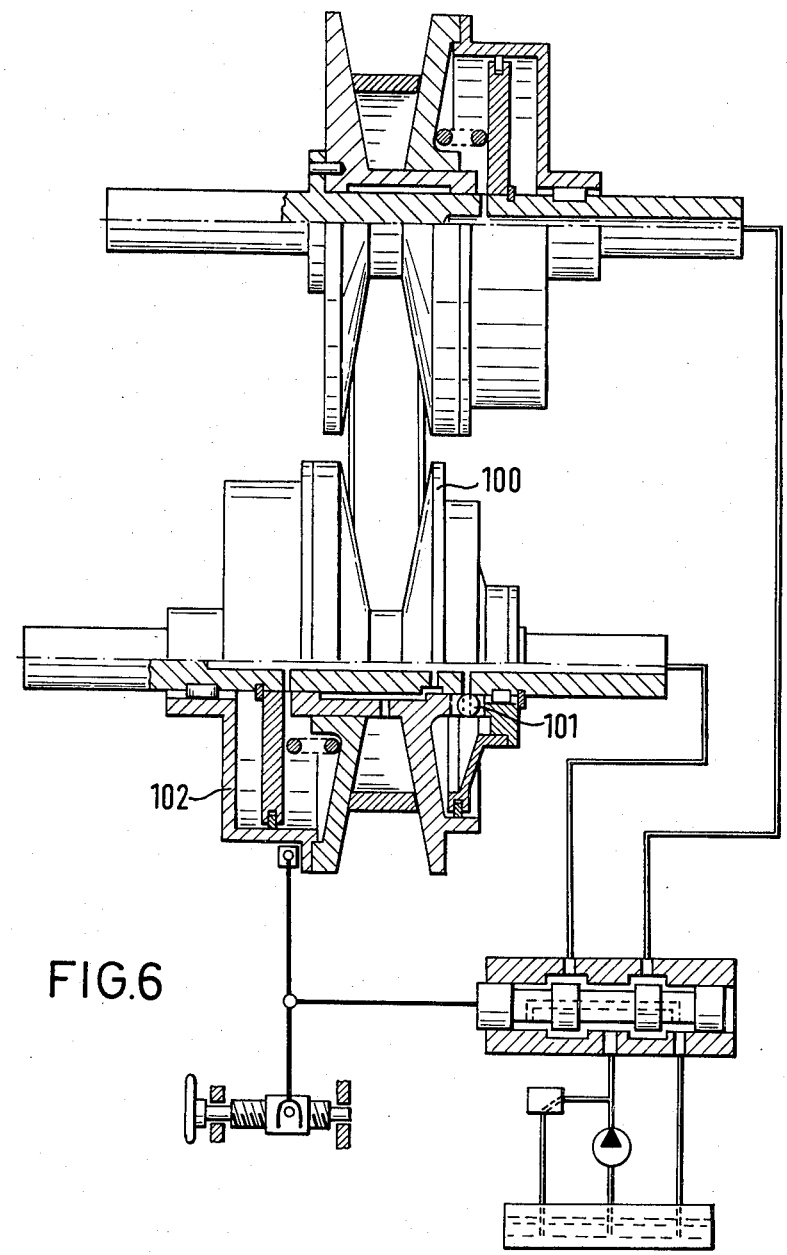

FIG. 6 shows an embodiment very similar to that of FIG. 5, so that the components identical to those shown in FIG. 5 will not be described in detail.

The sole difference from the example shown in FIG. 5 is that in FIG. 6 the pressure-medium pressure supplied to the nominally fixed pulley sheave 100 via the presser device 101 is that which prevails in the cylinder-piston unit 102 of the drive-input side. Thus, while, in the embodiment of FIG. 5, the pressure-medium pressure of the drive-output side is determined by the behavior of the nominally fixed pulley sheave 86 seated on the drive input shaft and the control device thus formed, in FIG. 6 the pressure on the drive-input side is determined by the action of the nominally fixed pulley sheave 100 and the control device 101 likewise mounted on the drive-input side.

Figure 7:
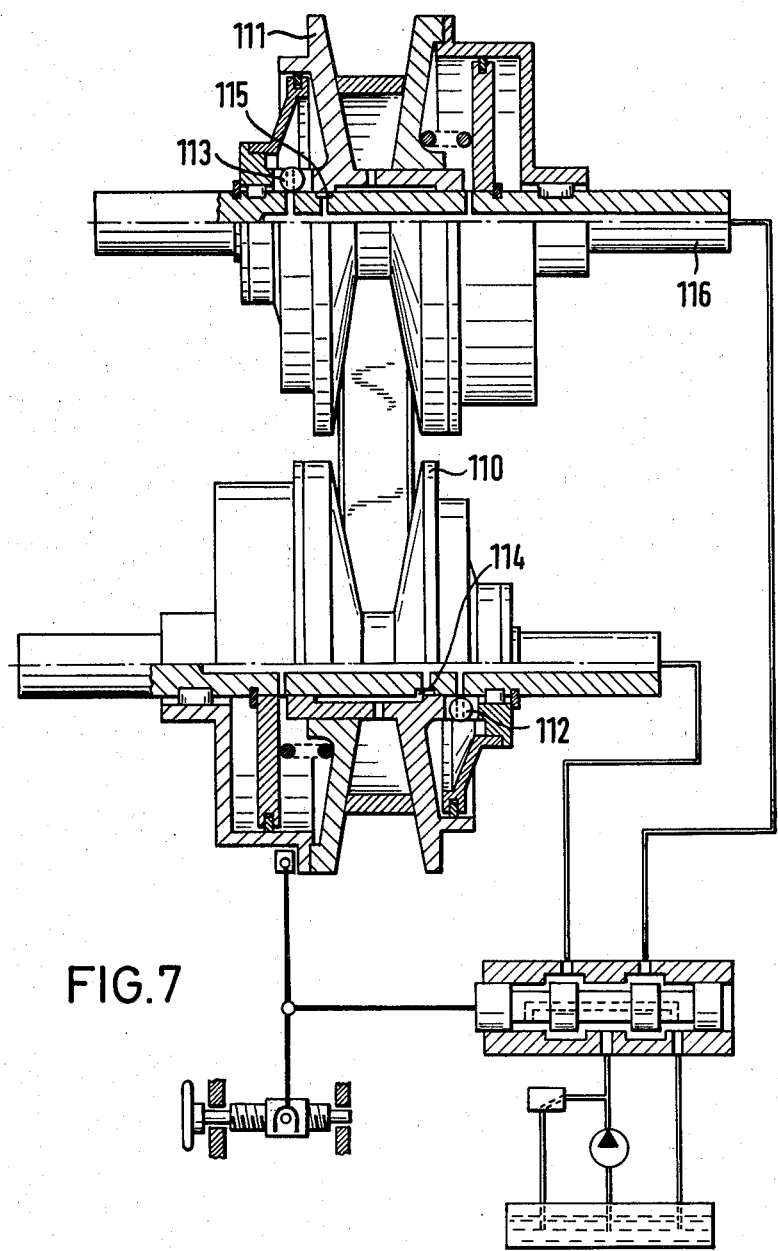
FIG. 7 is a view similar to that of FIG. 5 of a transmission provided with a torque sensor on each shaft.

The embodiment shown in FIG. 7 differs from that of FIG. 6 in that on each of the two transmission shafts, a respective nominally fixed pulley sheave 110 or 111 is provided together with a respective presser device 112 or 113 and control valve 114 or 115 to present two torque sensors which each determines the pressure-medium pressure in the piston-cylinder units on its associated shaft. This system is advantageous for systems where driving and retarding operations, that is to say a reversal of torque, occur so that an interchange takes place between drive-input and drive-output shaft functions.

However, only one of the torque sensors is ever effective while the other will be in a position in which its associated control valve is closed. If the transmission is set for low drive-output rotation speeds of the shaft 116, then the torque sensor 110, 112, 114 on the drive-input side is effective, while that on the drive-output side is ineffective, as shown. In the converse case the torque sensor 111, 113, 115 on the drive-output shaft 116 is active. The changeover point between the two mentioned extreme transmission settings results from the known conditions in cone-pulley belt-type transmissions automatically in a range which lies normally in the vicinity of the 1:1 transmission ratio.

The transmission forms as described hitherto with reference to FIGS. 1 to 7 are dependent upon the presence of an oil pressure on the control slide valve before the starting up of the transmission, that is to say either the oil pump 10 shown in FIG. 1 has initially started up or an external oil supply is switched on. Now, however, there are situations where an external oil supply is not available and it is desired for example to economize on a separate drive for the oil pump or this cannot be accommodated. The transmission shown in FIGS. 8 to 10 and described in detail below are suitable for such requirements.

Figure 8:
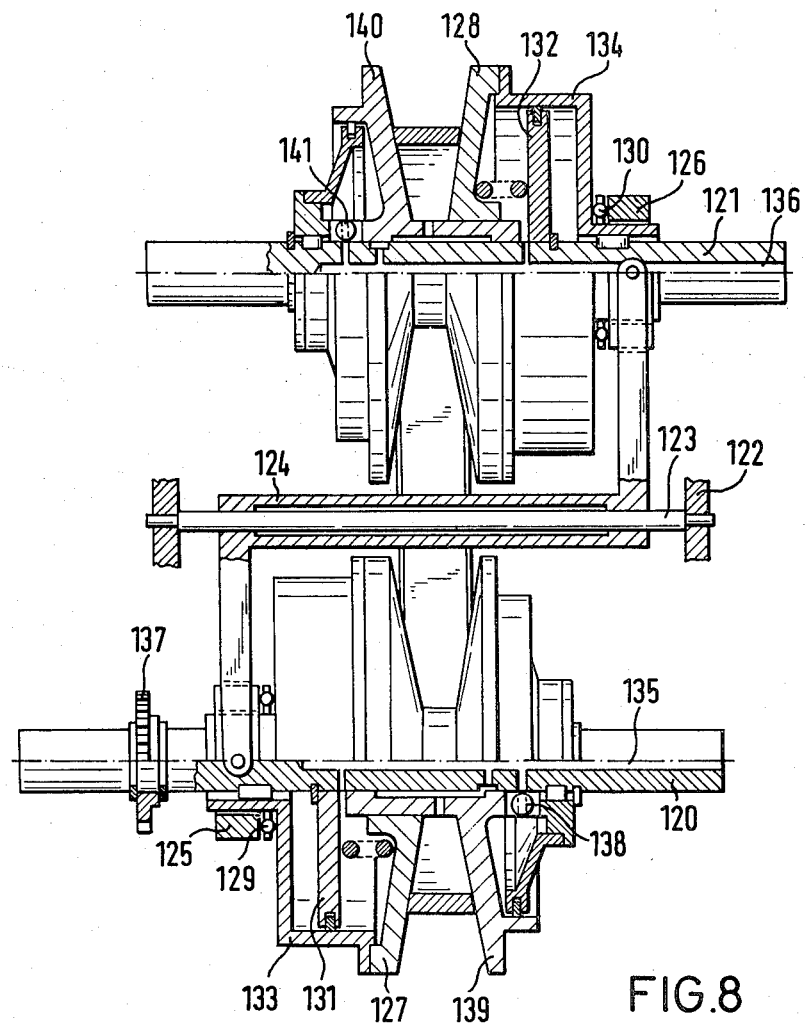
FIGS. 8 and 9 are views similar to that of FIG. 5 of transmissions provided with embodiments of the invention which eliminate the need for pump pre-running or an external oil supply.

FIG. 8 shows a transmission corresponding to that shown in FIG. 7. Here, however, centrally between the shafts 120 and 121 in the transmission casing 122 a guide rod 123 is mounted and a Z-shaped stirrup member 124 is mounted on rod 123 to be freely displaceable relative thereto. The cone pulley sheaves 127 and 128 serving for setting and maintaining the transmission ratio are rigidly connected to cylinder shells 133 and 134 enclosing pistons 131 and 132 axially fixed to shafts 120 and 121. Shells 133 and 134 are supported via anti-friction, or pivot, bearings 129 and 130 against thrust rings 125 and 126 supported by the free legs of stirrup member 124.

The oil flow for the drive-input and drive-output sides coming from the four-edged control slide valve (not shown) comes by way of the axial shaft bores 135 and 136.

The distance between the rings 125 and 126 measured in the axial direction is selected so that the bearings 129 and 130 have a small spacing in relation to the axial retention of the cone pulley sheaves 127 and 128 in normal operation of the transmission. Axial retention in this connection is provided by the support rings 125 and 126.

On the shaft 120 a pinion 137 is secured for rotation with the shaft and is connected to means (not shown) via which the pump for delivering the hydraulic medium is driven.

The transmission as thus illustrated works as follows, it being assumed that the shaft 120 is the drive-input shaft and the shaft 121 is the drive-output shaft. If the power source driving the transmission is switched on, firstly shaft 120 is driven, that is a torque is introduced into it. A pressure-medium pressure is initially not yet present. The presser device 138 however provides a pressure application force due to the introduction of the torque, which force presses the transmission means between the cone pulley sheaves 139 and 127, and thus tensions the transmission means, since the cone pulley sheave 127, by reason of its being supported against the ring 125 through the bearing 129, cannot yield. Thus the torque is transmitted by means of the tension means to the cone pulley sheaves 128, 140, where likewise a corresponding axial pressure application force is built up by means of the presser device 141. Here again the cone pulley sheave 128 by reason of its being supported by the ring 126 and the bearing 130 cannot yield. Thus initially a purely mechanical supporting of the cone pulleys takes place with simultaneous generation of torque-proportional pressure application forces upon both transmission shafts.

If the transmission has run up to speed in this way for a short time, the oil pump has been driven by means of the pinion 137 long enough to deliver the pressure-medium pressure necessary for the hydraulic generation of the pressure application forces on the pulley assemblies, which pressure is distributed to the two pulley sheave sets by the four-edged control side valve (not shown), as shown in FIG. 7.

Now the pressure-medium pressure necessary for the hydraulic support builds up in the cylinder-piston units arranged on the individual cone pulleys. Regarding the cone pulley sheaves 127 and 128, this has the consequence that they lift slightly away from the bearings 129 and 130 so that the mechanical support of these cone pulley sheaves is eliminated and taken over by the hydraulic support. Then the transmission runs exclusively under hydraulic control.

In this way it is thus possible to do without the generation of the requisite oil pressure before the starting up of the transmission. Rather the transmission can be started up immediately while the drive and the oil pressure build up in the start-up phase.

Figure 9:
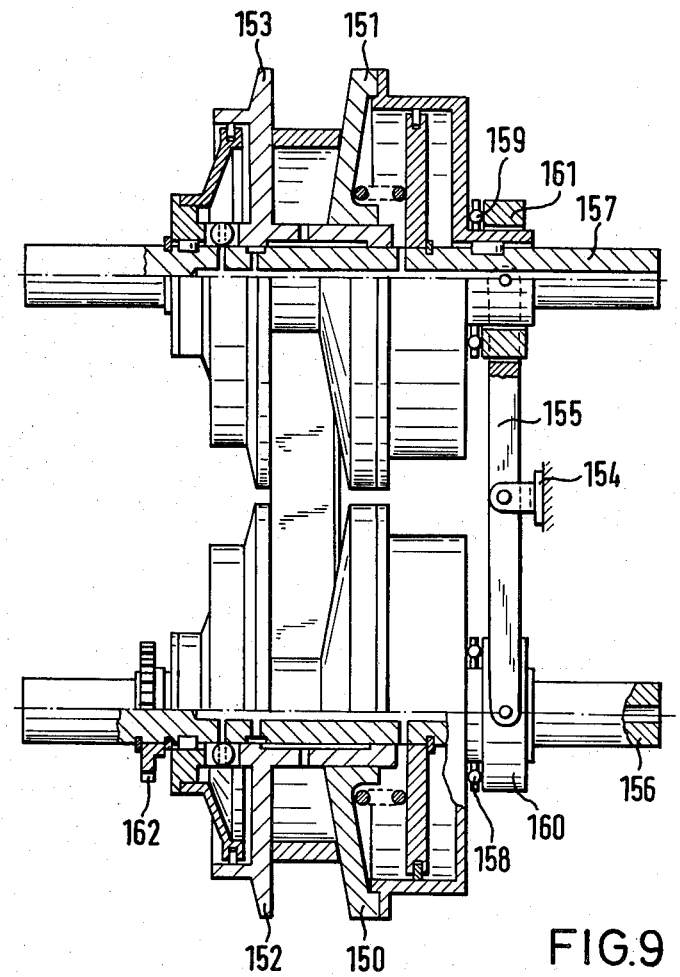

For the same purpose, FIG. 9 shows a transmission which differs from that of FIG. 8 only in that the cone pulley sheaves 150 and 151 serving for setting and maintaining the transmission ratio are arranged not diametrically but substantially radially opposite to one another. The same applies to the fixed pulley sheaves 152 and 153.

Here, on the transmission housing 154 a two-arm lever 155 is pivotably mounted at its center between the transmission shafts 156 and 157, against which lever the cone pulley sheaves 150, 151 are supported through anti-friction, or pivot, bearings 158, 159. Here incidentally, which also applies to FIG. 8, it can be seen clearly that the arms of lever 155 present forks which embrace thrust rings 160, 161 and carry them pivotably, which rings serve for supporting the bearings 158, 159. Otherwise the manner of operation of the transmission according to FIG. 9 is in conformity with that described with reference to FIG. 8, that is to say here again on the drive-input shaft 156 there is seated a pinion 162 to drive the oil pump during start-up of the transmission.

Figure 10:
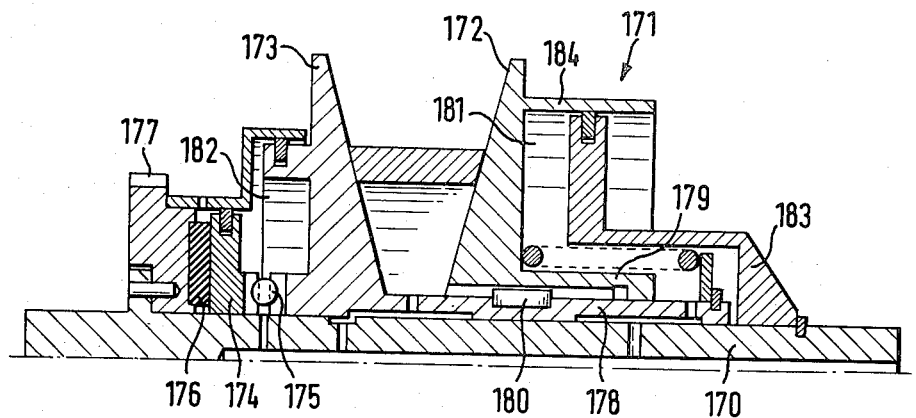
FIG. 10 is a cross-sectional, detail view showing a further embodiment of the invention serving to eliminate the need for pump pre-running or an external oil supply.

FIG. 10 shows an example corresponding to that of FIG. 7, but shown only in half section on one shaft for the sake of simplicity.

Here again the cylinder-piston unit 171 is arranged on the shaft 170. This unit is partly constituted by the cone pulley sheave 172 for setting and maintaining the transmission ratio. The nominally fixed pulley sheave 173, however, bears together with the ring 174 of the presser device 175, via a friction disc 176, against the pinion 177 for the drive of the oil pump, which pinion is axially supported by and connected to rotate with, the shaft 170.

Moreover, in the present case the neck 178 of the fixed pulley sheave 173 is prolonged into the neck 179 of the cone pulley sheave 172 and the cone pulley sheave 172 is axially displaceable on neck 178 but is held non-rotatably relative thereto by a key 180.

If now this transmission is started up, in which case thus initially there is no oil pressure in the cylinder chambers 181 and 182, the shaft 170 with the pinion 177 can rotate idly, since the piston 183 is rotatable in the cylinder shell 184. Then due to driving of the oil pump the oil pressure builds up slowly, and through the presser device 175 slowly leads to pressing of the ring 174 via the friction disc 176 against the pinion 177, whereby to an extent commensurate with the oil pressure the driving of the pulley assembly takes place. Build-up of the oil pressure on the other transmission shaft occurs in a corresponding manner, so that with the entraining of the pulley assembly as shown in FIG. 10 the corresponding torque transmission to the pulley assembly of the other transmission shaft can then also take place.

Figure 11:
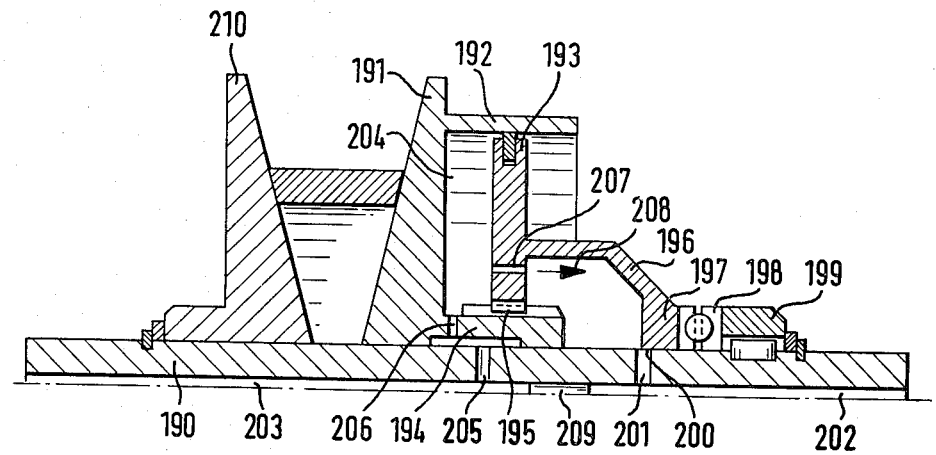
FIG. 11 is a view similar to that of FIG. 10 of an embodiment of a torque sensor according to the invention on the cylinder-piston unit of the cone pulley sheave for setting and maintaining the transmission ratio.

Finally FIG. 11 shows that it is also possible to fit the torque sensor according to the invention on the piston of the cylinder-piston unit which is formed by the cone pulley sheave for setting and maintaining the transmission ratio.

According to FIG. 11, on the shaft 190 a cone pulley sheave 191 for setting the transmission ratio is formed as a cylinder 192 in which a piston 193 is seated. The piston is mounted to be axially displaceable, but non-rotatable, relative to pulley sheave 191, by virtue of a toothed connection 195 on piston 193 and the neck 194 of the cone pulley sheave 191.

Piston 193 has an extension piece 196 which includes a radial part 197 extending inwardly to the shaft 190. The axially outer wall of radial part 197 forms pressor curves, for example V-shaped recesses, constituting a component of the presser device 198. The other component of device 198 is a ring 199 which is mounted fast with the shaft 190.

The radially inner edge 200 of the radial part 197 forms, with a radial bore 201 of the shaft 190, a control valve from which the pressure medium can flow away at low pressure by way of the axial bore 202 in the shaft 190.

A further axial bore 203 in the shaft 190 conducts pressure medium from the four-edged control slide valve to the cylinder chamber 204 via a radial bore 205 in the shaft and a radial bore 206 in the neck 194. Pressure medium flows from chamber 204 to the valve 200, 101 via bores 207 in the piston 196, in the direction 208. In order to isolate the axial bores 203 and 202 from one another a stopper 209 is interposed therebetween.

Thus, in this transmission the fixed pulley sheave 210 opposite to the cone pulley sheave 191 is sheave which is supported fixedly in the literal sense of the word in that it can be made fast to the shaft relative to both axial and rotational movement.

The manner of operation of the arrangement as illustrated with reference to FIG. 11 corresponds substantially to that illustrated with reference to FIGS. 2 to 10.

If the transmission of this embodiment is subjected to a torque surge, the operation of the presser device 198 leads to an equally surging displacement of the piston 193 to the left. This causes, firstly, a correspondingly higher supporting pressure on the cone pulley sheave 191 and next a pressure-medium pressure increase in the cylinder chamber 204 due to increased constriction by valve 200, 201. The same is true when, at a specific transmission ratio setting, the transmitted power increases. Then by the action of the presser device 198, this leads to an increased constriction of the outflowing pressure oil by the valve 200, 201.

It will be understood that the above description of the present invention is susceptible to various modifications, changes and adaptations, and the same are intended to be comprehended within the meaning and range of equivalents of the appended claims.

What is claimed is:

1. In an infinitely variable cone pulley transmission which includes a drive input shaft, a drive output shaft, a first pair of cone pulley sheaves arranged on the input shaft, a second pair of cone pulley sheaves arranged on the output shaft, transmission means circulating between the two pairs of pulley sheaves, with one pulley sheaves of each pair being mounted to be axially displaceable relative to, and rotatable with, its associated shaft, first and second pistons each fastened to a respective one of the input and output shafts, means including the one sheave of each pair defining two pressure cylinders each axially movable on its respective shaft, enclosing a respective piston, and defining with its respective piston a transmission ratio control chamber, a source of hydraulic pressure medium, a control slide valve presenting four control edges connected between the source and the control chambers for distributing pressure medium to the control chambers, a setting lever connected between the slide valve and the one sheave of one of the pairs, a torque sensor mounted on one of the shafts to sense the torque on that shaft for generating a pressure application force dependent on the load on the transmission, the torque sensor being connected to receive pressure medium at the pressure prevailing in one of the control chambers, and including a flow control valve for permitting pressure medium to flow from the sensor, the flow control valve being composed of two valve parts which are movable relative to one another to generate, in the sensor, a torque-dependent hydraulic pressure such that the sensor exclusively determines the requisite load-dependent, hydraulic pressure-application force, the improvement wherein:

said other sheave on said one of said shafts is mounted for limited axial displacement and rotation relative to its associated shaft;

said torque sensor comprises a torque-responsive presser device composed of a first part, means supporting said first part against axial and rotational movement relative to said one of said shafts, a second part rigidly secured to said other sheave on said one of said shafts, and rolling bodies interposed between said parts, said parts presenting mutually opposing, axially oblique faces against which said rolling bodies bear for axially displacing said other sheave and said second part relative to said one of said shafts and said first part by a distance dependent on the torque between said parts; and said other sheave is operatively associated with said flow control valve for causing movement of said other sheave relative to its associated shaft to control the relative movement between said valve parts.

2. An arrangement as defined in claim 1 wherein said shafts extend parallel to one another, said one sheave of one said pair is mounted to one side of said transmission means and said one sheave of the other said pair is mounted to the other side of said transmission means, whereby those sheaves are disposed diametrically opposite one another, and said pressure medium source is a pump, and further comprising: a stationary guide member located between, and extending parallel to, said shafts; an approximately Z-shaped stirrup member mounted on said guide member for movement parallel to said shafts and presenting two arms spaced apart in the axial direction of said shafts and extending radially of said shafts, each arm extending toward a respective shaft; support means carried at the free end of each said arm; pivot bearings interposed between each said one sheave and said support means carried by a respective arm for supporting each said one sheave with slight axial play against said support means; and pump drive means driven by one of said shafts and connected to drive said pump.

3. An arrangement as defined in claim 1 wherein said shafts extend parallel to one another, said one sheave of one said pair is mounted to the same side of said transmission means as is said one sheave of the other said pair, whereby those sheaves are disposed substantially radially opposite one another, and said pressure medium source is a pump, and further comprising: a stationary fulcrum member located substantially midway between said shafts; a two-arm lever centrally pivoted on said fulcrum member and extending substantially radially of said shafts with each arm of said lever extending toward a respective shaft; support means carried at the free end of each said arm; pivot bearings interposed between each said one sheave and said support means carried by a respective arm for supporting each said one sheave with slight axial play against said support means; and pump drive means driven by one of said shafts and connected to drive said pump.

4. An arrangement as defined in claim 1 wherein said source of hydraulic pressure medium is a pump, said arrangement further comprises a pump drive element rigidly fixed to said one of said shafts, said means supporting said first part comprise a friction coupling interposed between said pump drive element and the side of said first part which is remote from said second part, said other sheave on said one of said shafts includes a neck portion projecting axially of said one of said shafts towards said one sheave on said one of said shafts, and said one sheave on said one of said shafts is mounted on said neck portion to be axially movable but non-rotatable relative to said other sheave on said one of said shafts.

5. An arrangement as defined in claim 1 comprising means defining a piston-cylinder unit composed of a cylinder member and a piston member movable in said cylinder member, with one of said members being fixed against axial movement relative to said one of said shafts and the other one of said members being fixed to said other sheave, and conduit means connected to said unit for supplying thereto pressure medium at the pressure received by said torque sensor, and wherein the piston area of said unit is smaller than that of said one of said control chambers.

6. An arrangement as defined in claim 5 wherein said flow control valve comprises: a housing carried by said one of said members of said piston-cylinder unit; a slide valve movably mounted in said housing, said slide valve presenting a flow control piston constituting one of said flow control valve parts and said housing presenting a control edge disposed to one side of said flow control piston and constituting the other of said flow control valve parts; a feeler pin carried by said slide valve and directed toward said other one of said members of said piston-cylinder unit; spring means urging said slide valve toward said other one of said members for maintaining said feeler pin in contact therewith; and means defining a flow passage for supplying pressure medium at the pressure prevailing in said torque sensor to the interior of said housing at the opposite side of said flow control piston from said control edge.

7. An arrangement as defined in claim 1 or 5 further comprising an auxiliary stop member fixed to said one of said shafts between said sheaves associated with that shaft for limiting the axial movement of said other sheave toward said one sheave of its associated pair, said stop member being formed to constitute one of said valve parts, and wherein said other sheave presents a flow passage communicating with pressure medium at the pressure prevailing in said torque sensor and having an outlet end adjacent said stop member and defining the other one of said valve parts.

8. An arrangement as defined in claim 7 wherein said one of said shafts presents a radial bore arranged for conducting pressure medium at the pressure prevailing in said torque sensor to said flow passage.

9. An arrangement as defined in claim 1 or 5 wherein said one of said shafts is provided with a radial bore extending to its outer surface, connected to receive pressure medium at the pressure prevailing in said torque sensor and defining one of said control valve parts, said other sheave is formed to present a control edge cooperating with the end of said bore at the outer surface of said one of said shafts and defining the other one of said control valve parts, and said other sheave is provided with a flow passage extending between said flow control valve and a low pressure region enclosed by said transmission means for the flow of pressure medium from said flow control valve.

10. An arrangement as defined in claim 9 wherein said flow passage extends substantially axially at an acute angle to said one of said shafts.

11. An arrangement as defined in claim 9 wherein said other sheave includes a neck portion extending axially toward said one sheave of its associated pair and said flow passage is constituted by an axial groove on the inner periphery of said neck and a radial bore provided in said neck and extending from said groove.

* * * * *